(12) United States Patent
Sakamoto

(10) Patent No.: US 7,468,202 B2
(45) Date of Patent: Dec. 23, 2008

(54) HONEYCOMB STRUCTURAL BODY

(75) Inventor: Hirofumi Sakamoto, Chita-gun (JP)

(73) Assignee: NGK Insulators, Ltd., Nagoya (JP)

( * ) Notice: Subject to any disclaimer, the term of this patent is extended or adjusted under 35 U.S.C. 154(b) by 386 days.

(21) Appl. No.: 10/511,899

(22) PCT Filed: May 14, 2003

(86) PCT No.: PCT/JP03/05972

§ 371 (c)(1),
(2), (4) Date: Oct. 20, 2004

(87) PCT Pub. No.: WO03/101585

PCT Pub. Date: Dec. 11, 2003

(65) Prior Publication Data
US 2005/0214503 A1    Sep. 29, 2005

(30) Foreign Application Priority Data
May 30, 2002    (JP)    ............... 2002-157966

(51) Int. Cl.
*B32B 3/12* (2006.01)
(52) U.S. Cl. .................................... 428/116
(58) Field of Classification Search ................ 428/116
See application file for complete search history.

(56) References Cited

U.S. PATENT DOCUMENTS

| | | | |
|---|---|---|---|
| 4,233,351 A * | 11/1980 | Okumura et al. ............ 502/439 |
| 4,304,585 A * | 12/1981 | Oda et al. .................... 65/43 |
| 4,436,538 A * | 3/1984 | Tomita et al. ................ 55/482 |
| 4,455,336 A | 6/1984 | Ogawa et al. |
| 4,810,554 A * | 3/1989 | Hattori et al. ............... 428/116 |
| 5,387,399 A | 2/1995 | Nishida et al. |
| 5,505,910 A | 4/1996 | Nishida et al. |
| 5,514,446 A | 5/1996 | Machida et al. |
| 5,914,187 A | 6/1999 | Naruse et al. |
| 6,248,421 B1 | 6/2001 | Koike et al. |
| 2001/0003728 A1 * | 6/2001 | Ito et al. .................... 502/439 |
| 2002/0004454 A1 | 1/2002 | Domesle et al. |

FOREIGN PATENT DOCUMENTS

| | | |
|---|---|---|
| EP | 0 816 065 A1 | 1/1998 |
| EP | 0 867 222 A2 | 9/1998 |
| EP | 1 360 991 A1 | 11/2003 |

(Continued)

OTHER PUBLICATIONS

Translation of Japanese Published Patent Application No. 55-147154, published Nov. 15, 1980; Application Filing No. 54-55556, Files May 7, 1979; Inventors: Noshinori Narita.*

*Primary Examiner*—Timothy M Speer
*Assistant Examiner*—Gordon R Baldwin
(74) *Attorney, Agent, or Firm*—Oliff & Berridge, PLC

(57) ABSTRACT

Disclosed is a honeycomb structure 10 made by joining a plurality of honeycomb segments 1, 2 in each of which a plurality of cells each having a rectangular sectional shape are formed between partition walls 3 which are at right angles to each other. At least a portion of the honeycomb segments 1 constituting the outer periphery 5 of the honeycomb structure 10 has a structure in which compression strength is larger than that of the honeycomb segments 2 constituting the other portions of the honeycomb structure 10.

9 Claims, 3 Drawing Sheets

FOREIGN PATENT DOCUMENTS

| | | | |
|---|---|---|---|
| JP | A-54-110189 | 8/1979 | |
| JP | A 54-150406 | 11/1979 | |
| JP | A-54-150406 | 11/1979 | |
| JP | 55-147154 | * 11/1980 | |
| JP | A 55-147154 | 11/1980 | |
| JP | A-55147154 | 11/1980 | |
| JP | A-55-155742 | 12/1980 | |
| JP | 55-32232 | * 10/1981 | |
| JP | A-56-129043 | 10/1981 | |
| JP | B2 61-51240 | 11/1986 | |
| JP | U-62-163697 | 10/1987 | |
| JP | A-05-231608 | 9/1993 | |
| JP | 06-047617 | 2/1994 | |
| JP | A-07-286797 | 10/1995 | |
| JP | 08-028246 | 1/1996 | |
| JP | A 8-28246 | 1/1996 | |
| JP | 2002-301325 | 10/2002 | |
| JP | 2002-326035 | 11/2002 | |
| WO | WO 02/11884 A1 | 2/2002 | |

* cited by examiner

FIG.1(a)
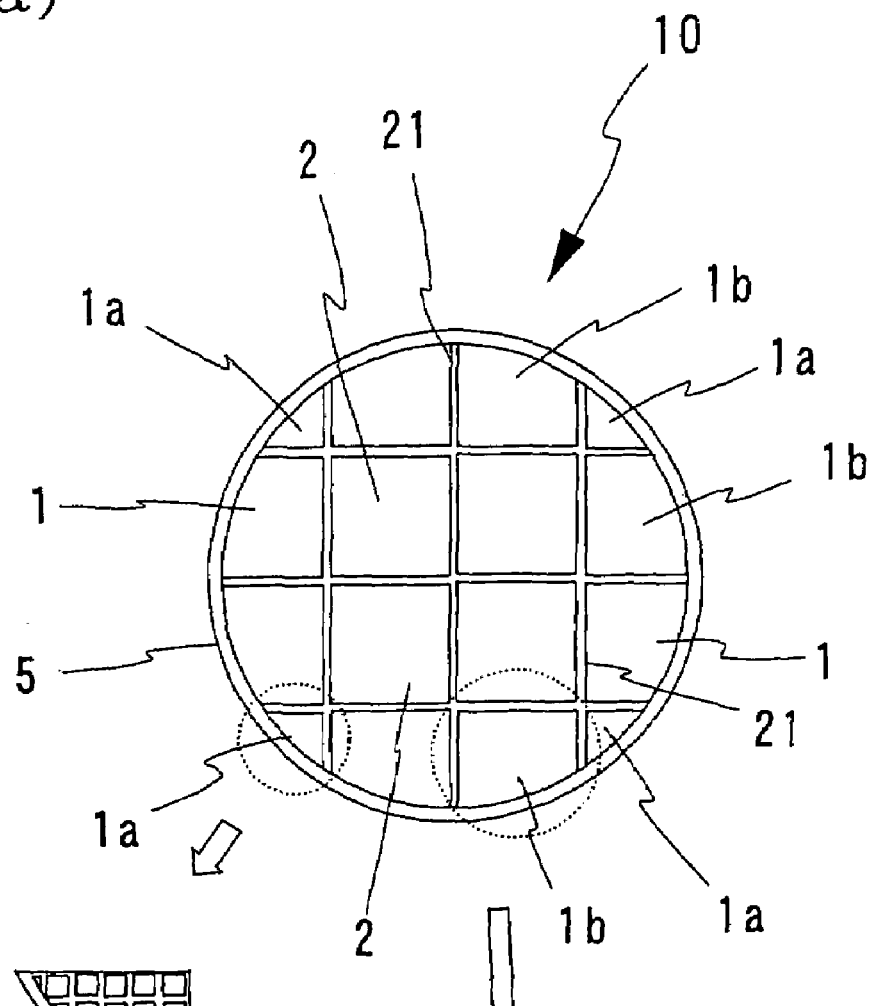
FIG.1(b)
FIG.1(c)
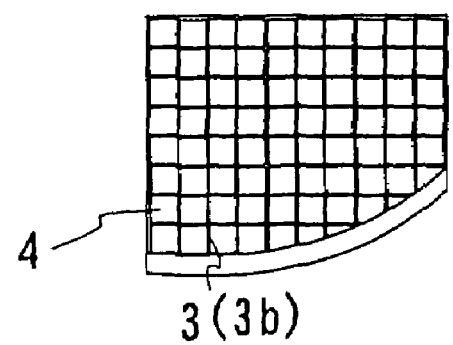

US 7,468,202 B2

HONEYCOMB STRUCTURAL BODY

TECHNICAL FIELD

The present invention relates to a honeycomb structure. More specifically, the present invention relates to a honeycomb structure composed of a combination of a plurality of honeycomb segments.

BACKGROUND ART

Ceramic honeycomb structures are actively used in various applications such as a catalyst carrier applied to combustion equipment such as a boiler and the like, internal combustion engines such as a diesel engine and the like, a chemical reactor, a reformer for fuel cell and the like, or a filter for trapping and removing particulate matters contained in exhaust gases, by making use of the characteristics of ceramic quality excellent in heat resistance.

Although these honeycomb structures are installed in a case with the outer peripheral side thereof gripped, they are often installed in such a manner that the outer peripheral side thereof is gripped with a large force as in a case that they are installed in the vicinity of an engine which is continuously subjected to large vibrations. Accordingly, it is very important in practical use that they have large compression strength on the outer peripheral side thereof so that they are not broken even if they are installed in the case while being gripped with a relatively large force.

Further, in a honeycomb structure used as, for example, an exhaust gas purifying filter, a filter regenerating process is executed therein to combust and remove carbon fine particles accumulated therein. In the filter regenerating process, the honeycomb structure is locally exposed to a high temperature. At the time, a problem arises in that cracks and the like are liable to occur in the honeycomb structure in a relatively short time of use because the thermal stress of the honeycomb structure is locally increased due to a difference of thermal expansion among respective portions thereof.

Further, a honeycomb structure used as a catalyst, a filter and the like for purifying exhaust gases is required to further improve a purifying capability by more reducing a thermal capacity and a pressure loss, improving a trapping efficiency, and the like. Thus, a decrease in thickness of the partition walls of the honeycomb structure and an increase in the porosity thereof are in progress in correspondence to the above requirement.

Incidentally, there has been proposed a honeycomb structure that is made by joining a plurality of honeycomb segments in order to be formed in a desired shape through joint members as a countermeasure against the problem of occurrence of cracks and the like in the honeycomb structure which are caused by being locally exsposed to high temperature (refer to Japanese Patent Publication (KOKOKU) No. 61-51240 and Japanese Patent Application Laid-Open No. 8-28246).

Further, in a honeycomb structure made integrally in its entirety, there has been proposed a structure, in which the partition walls of an outer peripheral portion are made thicker than internal partition walls, or the porosity of the partition walls thereof is reduced to provide sufficient compression strength even when the outer periphery of the honeycomb structure is gripped with a large force (refer to Japanese Patent Application Laid-Open Nos. 54-150406 and 55-147154).

However, any countermeasure is not taken into consideration to prevent breakages which selectively occur in particular portions of the so-called segment type honeycomb structure composed of a plurality of segments joined to each other when the honeycomb structure is used in a case by being gripped therein. Accordingly, when the honeycomb structure is mounted, a sufficient performance cannot be necessarily obtained. Further, in the honeycomb structure made integrally as a whole, the entire partition walls of the outer peripheral portion thereof are made thicker than inner partition walls and the porosity and the like thereof are reduced. With this arrangement, a thermal capacity and a pressure loss are greatly increased or a trapping efficiency is greatly reduced. Accordingly, a high purification performance, which is required by the times, cannot be achieved while satisfying desired compression strength.

Further, in the honeycomb structure made integrally as a whole, when a honeycomb structure in which partition walls are thicker in an outer peripheral portion than in an inner portion is made, and when a honeycomb structure in which cell density is larger in an outer peripheral portion than an inner portion is made, a difference of extrusion resistance is increased among the respective portions of the honeycomb structure by greatly changing a partition wall thickness and a cell density, from which a problem in extrusion forming arises in that defective forming is liable to occur in a resultant honeycomb structure. Likewise, when a honeycomb structure and the like, in which the porosity of the partition walls of an outer peripheral portion is smaller than that of the partition walls of an inner portion, is made, a material used in the partition walls of the outer peripheral portion is ordinarily replaced by a material having a smaller porosity. In the method, however, it is very difficult to provide the porosity of the partition walls with a desired change.

DISCLOSURE OF THE INVENTION

An object of the present invention, which was made in view of the problems described above, is to provide a honeycomb structure which can highly suppress occurrence of cracks and the like when it is used and can exhibit performances such as a high purification performance and the like while maintaining sufficient compression strength in practical use.

As a result of diligent studies for solving the problems described above, the inventors have found that the problems such as the defective forming and the like of the conventional honeycomb structure made integrally as a whole can be solved in a way that the outer periphery of the honeycomb structure is composed of honeycomb segments having large compression strength by changing the structure of each segment that contributes to the compression strength such as a partition wall thickness, partition wall density, cell density, cell shape or the like. Further, as a result of repeated studies, the inventors have found that when a honeycomb structure, which is formed by joining a plurality of honeycomb segments, is used in a case by being gripped therein, the stress applied on one honeycomb segment by gripping the honeycomb structure is eased only by the deformation of the partition walls existing in the honeycomb segment due to the existence of a joint member such as cement and the like, and thus a difference of compression strength is liable to occur in the respective honeycomb segments from the structural characteristics thereof, as compared with the honeycomb structure made integrally as a whole in which the stress can be eased by the deformation of the partition walls of the honeycomb structure in its entirety. In addition, the inventors have found from the further inspection of broken portions that the breakages selectively occur in the honeycomb segments in which the partition walls in the partition wall length direction on a cross section perpendicular to the fluid passage direction of a cell form an angle of 20 to 70° with respect to a tangent to the outer periphery of the honeycomb structure at the positions where the respective partition walls contact with an outer peripheral wall, and thus the above problems can be solved by applying a structure for increasing the compression strength only to these honeycomb segments. Accordingly, the inventors have completed the present invention.

That is, according to the present invention, there is provided a honeycomb structure made by joining a plurality of honeycomb segments in each of which a plurality of cells each having a quadrilateral sectional shape (which means a sectional shape in a direction perpendicular to the fluid passage direction of a cell) are formed by being defined by a plurality of partition walls which are at right angles to each other, characterized in that at least some of honeycomb segments constituting at least a portion of the outer periphery of the honeycomb structure have a structure in which the compression strength is larger than that of the honeycomb segments constituting the other portions of the honeycomb structure.

Here, the term "compression strength" used in the description means pressure by which the respective honeycomb segments are broken when the honeycomb structure formed by joining the respective honeycomb segments is pressurized by static water pressure. The compression strength used here is mainly pressure in a direction perpendicular to the fluid passage direction of a cell.

In the present invention, of the honeycomb segments constituting the outer periphery of the honeycomb structure, it is preferable that honeycomb segments in which the partition walls in the partition wall length direction on a cross section perpendicular to the fluid passage direction of a cell (hereinafter, may be simply referred to as "partition wall length direction") form an angle of 20 to 700 ° with respect to a tangent to the outer periphery of the honeycomb structure at the positions where the respective partition walls contact with an outer peripheral wall, have a structure in which the compression strength is larger than that of the honeycomb segments constituting the other portions of the honeycomb structure.

More specifically, of the honeycomb segments constituting the outer periphery of the honeycomb structure, it is preferable that honeycomb segments in which the partition walls in the partition wall length direction form an angle of 20 to 70° with respect to a tangent to the outer periphery of the honeycomb structure at the positions where the respective partition walls contact with an outer peripheral wall, are composed of partition walls having an average partition wall thickness larger than the honeycomb segments constituting the other portions of the honeycomb structure, having a porosity smaller than the honeycomb segments constituting the other portions of the honeycomb structure, or having a cell density larger than the honeycomb segments constituting the other portions of the honeycomb structure.

Further, in the present invention, of the honeycomb segments constituting the outer periphery of the honeycomb structure, it is also preferable that honeycomb segments in which the partition walls in the partition wall length direction form an angle of 20 to 70° with respect to a tangent to the outer periphery of the honeycomb structure at the positions where the respective partition walls contact with an outer peripheral wall, further include partition walls connecting the opposing corners of the respective cells each having a rectangular sectional shape, and cells each having a triangular sectional shape in a radial direction are formed between the respective partition walls.

Further, according to the present invention, a honeycomb structure is made by joining a plurality of honeycomb segments in each of which a plurality of cells each having a rectangular sectional shape in a radial direction are formed between the partition walls which are at right angles to each other, characterized in that the honeycomb segments have a structure in which all the partition walls in the partition wall length direction on a cross section perpendicular to the fluid passage direction of a cell form an angle of 0° or more to less than 200, or more than 70° to 90° or less with respect to a tangent to the outer periphery of the honeycomb structure at the positions where the respective partition walls contact with an outer peripheral wall.

As described above, in the present invention, the structure, which relates to the compression strength such as the partition wall thickness, the partition wall density, the cell density, and the like, is changed in the unit of the honeycomb segments constituting the honeycomb structure in stead of simply composing the outer periphery of the honeycomb structure having large compression strength. Accordingly, the respective portions of the honeycomb structure can be easily composed of a different material, thereby the density of the partition walls can be greatly changed. Likewise, in the honeycomb structure, the partition walls are not deformed at all even if the partition wall thickness and the cell density are greatly changed.

Further, in the present invention, the partition wall thickness, the partition wall density, the cell density, and the like are increased in only the honeycomb segments disposed at the particular positions, that is, "the honeycomb segments in which the partition walls in the partition wall length direction form an angle of 20 to 70° with respect to a predetermined tangent to the outer periphery of the honeycomb structure". Accordingly, performances such as a high purification performance and the like can be exhibited while maintaining desired compression strength. In particular, since it is important to secure the compression strength in the honeycomb structure having a thin wall thickness and a high porosity, the present invention is useful in that the compression strength, which is required in practical use, can be secured while satisfying a requirement for the improvement of performance by decreasing a wall thickness and increasing a porosity.

BRIEF DESCRIPTION OF THE DRAWINGS

FIG. 1(a) is an upper surface view schematically showing an embodiment of a honeycomb structure according to the present invention as well as FIGS. 1(b) and 1(c) are enlarged views of a part of the honeycomb structure.

Figure 2:
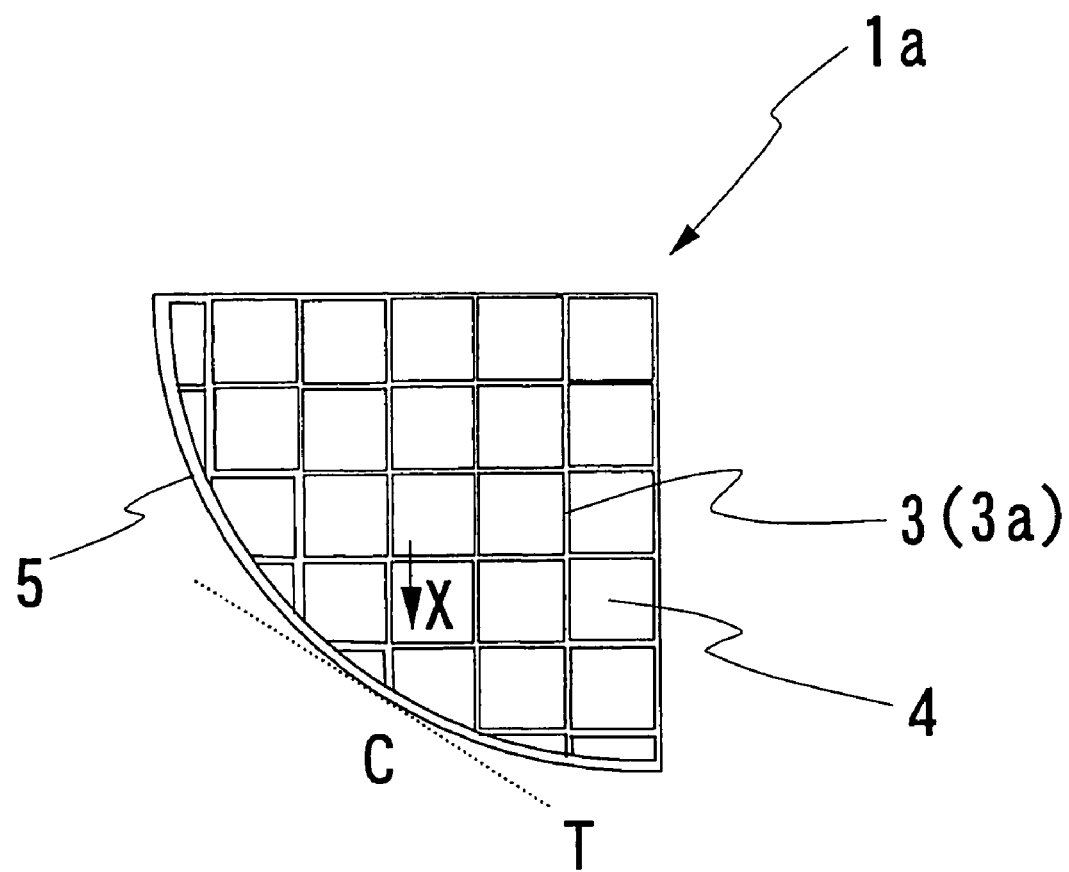
FIG. 2 is an enlarged view of a part of the honeycomb structure according to the present invention for schematically showing a positional relationship between a partition wall length direction on a radial cross section of the honeycomb structure in the partition walls of each honeycomb segment and an outer peripheral tangential line of the honeycomb structure.

Note that, in the above figures, the following reference numerals denote members or structures as shown below.

EXPLANATION OF REFERENCE NUMERALS

Reference numerals 1, 1a, 1b and 2 denote honeycomb segments, respectively, 3, 3a, 3b denote partition walls, respectively, 4 denotes a cell, 5 denotes the outer periphery (wall), 10 denotes a honeycomb structure, and 21 denotes a joint member.

BEST MODE FOR CARRYING OUT THE INVENTION

An embodiment of the present invention will be specifically explained below based on the figures. FIG. 1(a) is an upper surface view schematically showing an embodiment of a honeycomb structure of the present invention, FIGS. 1(b) and 1(c) are enlarged views each showing a part of the honeycomb segment at a particular position in the honeycomb structure, and FIG. 2 is an enlarged view of a part of the honeycomb structure according to the present invention for schematically showing a positional relationship between a partition wall length direction in respective honeycomb segments and an outer peripheral tangential line of the honeycomb structure.

As shown in FIG. 1, the honeycomb structure 10 of the present invention is composed of a plurality of joined honeycomb segments 1, 2 each having a plurality of cells 4 between a plurality of partition walls 3, each cells 4 having a rectangular cross section. In the honeycomb structure 10, at least portions 1a of the honeycomb segments 1 constituting the outer periphery 5 of the honeycomb structure 10 have a structure in which the compression strength is larger than that of the honeycomb segments 2 constituting the other portions of the honeycomb structure 10.

The honeycomb structure 10 will be specifically explained below.

The honeycomb structure 10 of the present invention is made by joining a plurality of honeycomb segments which are different in at least a physical property, for example, the segments 1 mainly disposed in a peripheral portion and the segments 2 mainly disposed in a central portion. Accordingly, even if the honeycomb structure is composed of a material having a large coefficient of thermal expansion such as SiC and the like, occurrence of cracks and the like can be prevented by reducing generation of local thermal stress in use.

Further, in the respective honeycomb segments constituting the honeycomb structure according to the present invention, the plurality of cells 4 being defined between the respective partition walls 3 which are at right angles to each other are formed in a quadrilateral sectional shape, that is in a square sectional shape or a rectangular sectional shape. Accordingly, not only a die for extrusion forming of the respective segments can be extremely easily made but also the heat shock resistance of a resultant honeycomb structure can be also improved.

Further, in the honeycomb structure 10 of the present invention, the honeycomb segments 1a, which is a kind of a series of the segments 1 disposed to constitute the outer periphery 5 of the honeycomb structure 10, have a structure in which the compression strength is larger than that of the honeycomb segments 2 that are segments other than the segments used to constitute the outer periphery 5 of the honeycomb structure 10 (hereinafter, the above structure may be referred to as "high strength structure"). With the above arrangement, a honeycomb structure having desired compression strength can be made without occurrence of the deformation and the like of the partition walls due to a difference of extrusion resistance as in the manufacture of an integral type honeycomb structure having partition walls of different thickness in each position thereof.

As shown in FIG. 2, as the honeycomb segments of high strength structure to be disposed in a portion of the outer peripheral wall 5 at the position C where the partition walls length direction X on a cross section perpendicular to the fluid passage direction of a cell 4 form an angle of 20 to 70° with respect to a tangent T to the outer periphery of the honeycomb structure 10, it is preferable to dispose the honeycomb segments (which may be simply referred to as "low strength honeycomb segments" hereinafter) 1a in which partition walls 3a form the above-mentioned angle with respect to a tangent to the outer periphery. It is more preferable to dispose the honeycomb segments 1a in which the partition walls 3a in the partition wall length direction X form an angle of 30 to 60° with respect to a tangent T to the outer periphery, and it is particularly preferable to dispose the honeycomb segments 1a in which the partition walls 3a in the partition wall length direction X form an angle of 40 to 50° with respect to a tangent T to the outer periphery.

In the honeycomb structure composed of the honeycomb segments joined together, the honeycomb segments 1a in which the partition walls 3a in the partition wall length direction X on the cross section perpendicular to the fluid passage direction of a cell is within the above range, have very small compression strength. Accordingly, the above positions are intensively reinforced using the honeycomb segments 1a so that an increase in a thermal capacity and a pressure loss and a decrease in a trapping efficiency can be suppressed as much as possible while effectively increasing the compression strength. As a result, it is possible to exhibit a high purification performance in response to recent requirements which becomes increasingly severe. That is, since the segments 1a are compressed from an oblique direction (from a so-called C-axis) in canning, they are located at portions which are broken first when a compression load is applied to the overall honeycomb structure. Accordingly, an advantageous effect of increasing strength is exhibited by intensively reinforcing the segments 1a while minimizing other effects.

Of the plurality of the honeycomb segments 1 which constitute the outer periphery of the honeycomb structure 10, honeycomb segments having a large partition wall thickness, a small average partition wall porosity or a large cell density as compared with honeycomb segments 1b and the segments 2, which constitute the other portions of the honeycomb structure, may be used and disposed as the above low strength honeycomb segments 1a.

In the present invention, the low strength honeycomb segments 1a as the high strength structure may be composed only one kind of the segments having the above properties. However, it is preferable to provide segments composed of a combination of at least two kinds of these high strength structures from the standpoint that the compression strength can be secured without deteriorating the properties such as the purification performance and the like by executing the intensive reinforcement as described above.

In the present invention, the partition wall thicknesses of the honeycomb segments 1, 2 are not particularly limited. However, it is preferable that the ratio of the thickness of the partition wall 3a of the low strength honeycomb segments 1a to the thickness of the partition walls of the honeycomb segments 1b and 2 other than the honeycomb segments 1a (ratio of average partition wall thickness of the low strength honeycomb segments/average partition wall thickness of basic honeycomb segments) is preferably in the range of 1.1 to 5.0, more preferably in the range of 1.2 to 3.0, and particularly preferably in the range of 1.2 to 2.0 from the standpoint of preventing the local breakage of the partition walls while exhibiting a desired purification performance by suppressing the increase in the pressure loss, the thermal capacity, and the like.

Further, to exhibit the desired purification performance by suppressing the increase in the pressure loss, the thermal capacity, and the like, the maximum thickness of the partition walls 3 of the respective honeycomb segments including the honeycomb segments 1*a* is preferably in the range of 0.03 to 1.3 mm, more preferably in the range of 0.05 to 0.8 mm, and particularly preferably in the range of 0.1 to 0.5 mm as long as the above relationship is established.

In the present invention, the average porosity of the partition walls 3 that constitute the respective honeycomb segments is not particularly limited. However, the average porosity of the partition walls 3*a* constituting the low strength honeycomb segments 1*a* is made smaller than that of the partition walls 3*b* constituting the basic honeycomb segments 1*b* and 2 preferably by 5 to 90%, more preferably by 10 to 70%, and particularly preferably by 10 to 45% from the standpoint of preventing the local breakage of the partition walls while exhibiting the desired purification performance by suppressing the increase in the thermal capacity and the decrease in the trapping efficiency.

Further, in the partition walls constituting any of the honeycomb segments, the average porosity of the partition walls is set to preferably 5 to 80%, more preferably to 10 to 70%, and particularly preferably to 20 to 65%, as long as the above relationship is established, to secure the pressure loss and desired mechanical strength.

In the present invention, the cell density of the respective honeycomb segments is not particularly limited. However, the cell density of the low strength honeycomb segments 1*a* is made larger than that of the basic honeycomb segments 1*b* and 2 preferably by 10 to 400%, more preferably by 15 to 200%, and particularly preferably by 20 to 100% to prevent the local breakage of the partition walls while preventing the increase in the pressure loss.

In any of the honeycomb segments 1, 2, the cell density is preferably in the range of 100 to 1500 cells/in$^2$ (15.5 to 232.5 cells/cm$^2$), more preferably in the range of 150 to 1200 cells/in$^2$ (23.3 to 186.0 cells/cm$^2$), and particularly preferably in the range of 200 to 900 cells/in$^2$ (31.0 to 139.5 cells/cm$^2$), as long as the above relationship is established, to secure the pressure loss and the desired mechanical strength.

Note that, in the present invention, since the above high strength structure is provided in the unit of segment, a honeycomb structure having the high strength structure can be made without deforming the partition walls in forming and the like.

More specifically, the compression strength of a thin wall honeycomb structure having a partition wall thickness of 0.1 mm or less and the compression strength of a honeycomb structure having a high porosity of 50% or more can be effectively improved by setting the ratio of the average partition wall thickness of the low strength honeycomb segments 1*a* to that of the basic honeycomb segments 1*b*, 2 to 1.4 to 2.0; making the porosity of the partition walls constituting the low strength honeycomb segments 1*a* smaller by 3 to 45% than that constituting the basic honeycomb segments 1*b*, 2; and making the cell density of the low strength honeycomb segments larger by 20 to 100% than that of the basic honeycomb segments. In addition, a high performance achieved by reducing the wall thickness and increasing the porosity is secured.

Exemplified further as the high strength structure of the present invention is a high strength structure which is arranged such that the low strength honeycomb segments 1*a* are further provided with partition walls for connecting the opposing corners of cells each having a square sectional shape so that cells each having a triangular sectional shape are formed between the respective partition walls.

In the present invention, the ratio of the cells having the triangular sectional shape to all the cells in the low strength honeycomb segments 1*a* may be set within an appropriate range in consideration of the other structures relating to the compression strength such as the partition wall thickness, the porosity, and the like, conditions under which the segments 1*a* are used, and the like. However, in the low strength honeycomb segments 1*a*, the ratio of the cells having the triangular sectional shape to all the cells is preferably set to 10 to 70%, and more preferably to 30 to 50% to effectively improve the compression strength while suppressing the increase in the pressure loss.

Further, of the honeycomb segments 1 constituting the outer periphery of the honeycomb structure 10, the honeycomb segments 1*a*, in which the partition walls 3*a* in the partition wall length direction X on the cross section perpendicular to the fluid passage direction of a cell form an angle of the above range with respect to a tangent T to the outer periphery of the honeycomb structure 10 at the position C where the respective partition walls contact with the outer peripheral wall 5 as shown in FIG. 2, is replaced by the honeycomb segments as the high strength structure in the present invention in which the partition walls have an angle of the range other than the above range with respect to a tangent T. That is, the outer periphery 5 of the honeycomb structure 10 is composed of honeycomb segments in which all the partition walls in the partition wall length direction X on a cross section perpendicular to the fluid passage direction of a cell form an angle of o 0° or more to less than 20°, or more than 70° to 90° or less with respect to a tangent T to the outer periphery of the honeycomb structure 10 at the position C where the respective partition walls contact with the outer peripheral wall 5.

In the high strength structure arranged as described above, the desired compression strength can be obtained without changing any of the partition wall thickness, the partition wall porosity, and the like described above. Accordingly, a higher purification performance and the like can be exhibited because the increase in the pressure loss and the thermal capacity, and the like can be suppressed. Note that in the present invention, the partition wall length direction X can be adjusted for each of the honeycomb segments 1, 2. Thus, it is not necessary to produce a die having a complex shape and the partition walls are not deformed by the difference of extrusion resistance in forming, different from the integrally formed honeycomb structure.

In the honeycomb segments 1 constituting the outer periphery of the honeycomb structure 10 according to the present invention, all the partition walls in the partition wall length direction X form preferably an angle of 0° or more to less than 20° or less, or more than 70° to 90° or less, and more preferably an angle of 0° or more to less than 15°, or more than 75° to 90° or less, with respect to a tangent to the outer periphery at the positions C where the respective partition walls contact with the outer peripheral wall in order to increase the compression strength effectively.

Note that principal high strength structures of the present invention have been described above. However, it is needless to say that the honeycomb structure of the present invention may be provided with any other high strength structures as long as they have a structure for increasing the compression strength. That is, the object of the present invention can be achieved by improving the strength of a material by, for example, coating or dipping a catalyst and the like carried by alumina and the like.

In the present invention, exemplified as the material of the honeycomb segments 1, 2 is ceramics whose main crystalline phases are composed of at least one kind selected from the group consisting of, for example, non-oriented cordierite, oriented cordierite, mullite-zircon, mullite, zircon, cordierite-mullite, mullite-aluminum titanate, clay bond silicon carbide, silicon carbide, metal silicon, zirconia-spinel, etc. Among them, it is preferable to use the silicon carbide or the metal silicon and the silicon carbide as main crystals because they are excellent in heat resistance and heat conductivity and can reduce the thermal stress of the respective portions of a filter while securing the high heat conductivity of the overall filter.

In the present invention, the number of the honeycomb segments 1, 2 constituting the honeycomb structure 10 is not particularly limited. However, it is preferable to compose the honeycomb structure 10 having nine or more honeycomb segments 1, 2 to reduce the occurrence of local thermal stress. Further, it is preferable to compose the outer periphery 5 of the honeycomb structure 10 having eight or more honeycomb segments 1 and it is more preferable to compose the same having twelve or more honeycomb segments 1 in order to intensively improve the strength of the portions which are liable to be broken when they are gripped to thereby prevent the deterioration of the basic performances such the purification performance and the like.

Further, it is sufficient for the cells 4 of the present invention to have any of quadrilateral sectional shapes, and a square sectional shape, a rectangular sectional shape, and the like can be exemplified as the sectional shapes. However, it is preferable that the cells 4 are formed in the rectangular sectional shape in a radial direction to more improve the heat shock resistance of the honeycomb structure 10. In contrast, when the cells are formed in the square sectional shape in the radial direction, the compression strength of the honeycomb structure 10 can be improved. Accordingly, it is also preferable that at least some of the honeycomb segments 1 constituting the outer periphery 5 of the honeycomb structure 10 have cells formed in the square sectional shape in the radial direction.

Note that when the honeycomb structure of the present invention is used as an exhaust gas purification filter, it is sufficient for the plurality of cells 4 of the respective honeycomb segments 1, 2 to have such a structure that the cells are alternately plugged with a plug member at both the ends thereof where the cells 4 open.

Further, when the honeycomb structure 10 of the present invention is used as a catalyst, it is sufficient to cause the partition walls 3 to carry a metal having a catalytic property, for example, Pt, Pd, Rh, etc.

Although the honeycomb structure 10 of the present invention is integrated by joining the honeycomb segments 1, 2 described above, the joint structure, a kind of a joint agent, and the like are not particularly limited. For example, adjacent honeycomb segments 1a, 1b may be joined together with a joint agent 21 through a part of confronting sides or through the overall confronting sides (FIG. 1(a) shows an example that the honeycomb segments are joined through the overall sides). It is preferable that the joint agent 21 be mainly composed of a heat resistant inorganic compound because it is excellent in heat resistance and the heat shock resistance. Further, it is preferable that the heat resistant inorganic compound contains at least one kind of, for example, a fiber material containing ceramics similar to that of the honeycomb segments 1, 2 described above and metal, and cement such as hydrated cement, thermosetting cement, etc.

Note that the respective segments that constitutes the honeycomb structure 10 of the present invention are made by a method ordinarily executed in a ceramic honeycomb structure and they are joined together by a method used to join ceramic structures. For example, the honeycomb structure 10 can be obtained as described below. That is, a clay is obtained by kneading a raw material, which is composed of a desired ceramic material added with a binder, a dispersing agent and the like, and a desired amount of water; the clay is formed to honeycomb segments having a desired shape by extrusion forming and the like and dried or further fired, and then the respective honeycomb segments are jointed together.

Although the present invention will be explained in more detail based on specific examples, it is by no means limited to these examples.

EXAMPLE 1

Mixed powder containing 75% by weight of SiC powder and 25% by weight of metal Si powder was prepared as a ceramic material. 6 parts by weight a binder, which was composed of methyl cellulose and hydroxypropoxyl methyl cellulose, 0.8 part by weight of a surface-active agent, and 22 parts by weight of water were added to 100 parts by weight of the resultant blended powder. The resultant was kneaded in a kneading machine, thereby a clay having plasticity was obtained.

Next, the clay was subjected to extrusion forming to form the honeycomb segments 1a, 1b, and 2 having shapes corresponding to the shapes of the respective pieces of 16 portions obtained by dividing the honeycomb structure 10 having an cylindrical outside appearance as shown in FIGS. 1(a) and 2. At the time, in all the four honeycomb segments 1a in which the partition walls in the partition wall length direction X on a cross section perpendicular to the fluid passage direction of a cell formed an angle of 20 to 70° with respect to a tangent T to the outer periphery at the positions where the respective partition walls 3 contacted with an outer peripheral wall (the partition walls 3 constituted the outer peripheral wall of the honeycomb structure after they were connected thereto), the thickness of the partition walls of was set to 0.432 mm and the outside dimension of each honeycomb segment was set to 35 mm×35 mm×154 mm,. In contrast, the thickness of all the partition walls of the other honeycomb segments 1b, 2 was set to 0.304 mm. Further, all the honeycomb segments 1, 2 had cells 4 each having a square sectional shape, and a cell density was set to 300 cells/in$^2$ (46.5 cells/cm$^2$).

Next, after the respective honeycomb segments were microwave or hot-air dried, a joint agent composed of cement was applied to the sides of the respective honeycomb segments so that the honeycomb segments were integrated. Further, the integrated honeycomb segments were fired at about 1550° C. in an Ar atmosphere, thereby a honeycomb structure of 143 mmø×154 mmL was made. Note that partition walls constituting the respective honeycomb segments had approximately the same porosity of about 52%.

COMPARATIVE EXAMPLE 1

A honeycomb structure was made similarly to the example 1 except that in the four honeycomb segments 1a, in which the partition walls in the partition wall length direction X on a cross section perpendicular to the fluid passage direction of a cell formed an angle of 20 to 70° with respect to a tangent T to the outer periphery at the positions where the respective partition walls 3 contacted with an outer peripheral wall 5 (the partition walls 3 constituted the outer peripheral wall of the honeycomb structure after they were connected thereto) as shown in FIGS. 1, 2 in the example 1, the thickness of the partition walls was set to 0.304 mm.

Evaluation Method

Five honeycomb structures were made, respectively by the manufacturing methods described in the example 1 and the comparative example 1, and the compression strength thereof was evaluated as shown below.

First, both the ends of the respective honeycomb structures were covered with metal sheets having the same diameter as the respective honeycomb structure. Further, after the metal sheets were fixed by rubber tubes having the same diameter as the respective honeycomb structure, the honeycomb structures were hermetically sealed by bonding rubber tapes to the rubber tubes and their vicinities so that water does not come into the honeycomb structures.

Next, in this state, the honeycomb structures were dipped into water, water pressure was increased until any arbitrary portion of each honeycomb structure was broken, and water pressure when the breakage occurred was evaluated as compression strength (MPa).

Result of Evaluation

Figure 3:
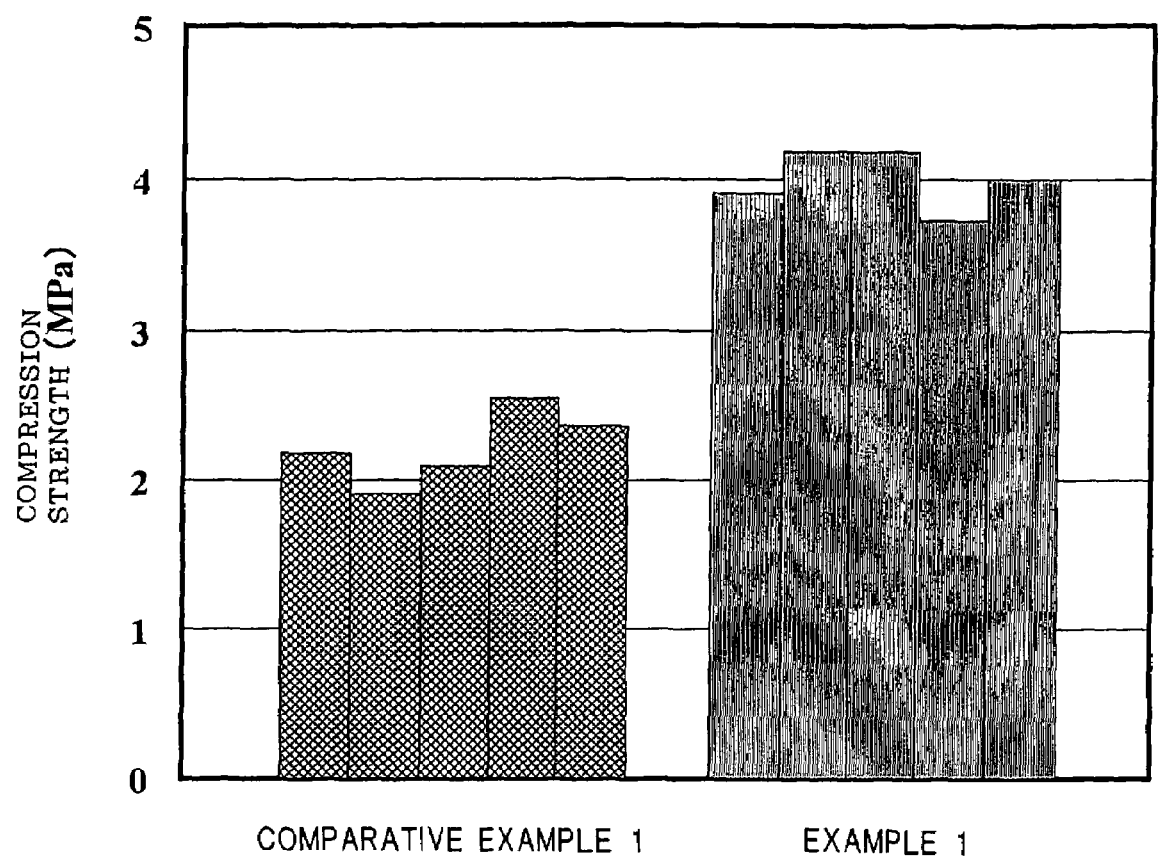
FIG. 3 is a graph showing a result of compression strength between a honeycomb structure of an example 1 and a honeycomb structure of a comparative example 1.

As shown in FIG. 3, in the honeycomb structures of the comparative example 1 in which all the partition walls had the same thickness, the compression strength was 2 MPa. Whereas, in the honeycomb structures of the example 1 in which the thickness of the partition walls of only the particular honeycomb segments was set from 0.304 mm to 0.432 mm, the compression strength was greatly increased to about 4 MPa. Further, as to a mode of breakage, in the honeycomb structures of the comparative example 1, the partition walls of the honeycomb segments 1a shown in FIG. 1(a) were selectively broken. Whereas, in the honeycomb structures of the example 1, any pattern was not particularly found as to broken portions. Accordingly, it was found that the strength of the honeycomb structure of the example 1 was significantly improved by intensively reinforcing the particular portions using the particular honeycomb segments. It should be noted that, in a honeycomb structure having the same arrangement as the honeycomb structure of the embodiment 1, it can be naturally expected that even if the thicknesses of all the partition walls are set to 0.432 mm, the compression strength which is approximately the same as the honeycomb structure of the embodiment 1 can be obtained and moreover a pressure loss and a thermal capacity are much smaller than those of the honeycomb structure of the comparative example.

INDUSTRIAL APPLICABILITY

As explained above, according to the present invention, there can be provided a honeycomb structure which can highly suppress occurrence of cracks and the like when the honeycomb structure is used as well as can exhibit a high purification performance and the like while maintaining compression strength that is sufficient in practical use.

The invention claimed is:

1. A honeycomb structure made by joining a plurality of honeycomb segments in each of which a plurality of cells each having a quadrilateral sectional shape are formed by being defined by a plurality of partition walls which are at right angles to each other, characterized in that some but not all of the honeycomb segments constituting at least a portion of the outer periphery of the honeycomb structure have a structure in which compression strength of a majority of partition walls is larger than that of the honeycomb segments constituting the other portions of the honeycomb structure, wherein the plurality of partition walls, within the some but not all honeycomb segments, form an angle of 20 to 70 degrees within respect to a tangent of the outer periphery of the honeycomb structure at the point the partition wall intersects the periphery.

2. The honeycomb structure according to claim 1, wherein the partition walls within the some but not all honeycomb segments have an average partition wall thickness larger than the honeycomb segments constituting the other portions of the honeycomb structure.

3. The honeycomb structure according to claim 1, wherein the partition walls within the some but not all honeycomb segments have partition walls having an average porosity smaller than the honeycomb segments constituting the other portions of the honeycomb structure.

4. The honeycomb structure according to claim 1, wherein the some but not all honeycomb segments have a cell density larger than the honeycomb segments constituting the other portions of the honeycomb structure.

5. The honeycomb structure according to claim 1, wherein the some but not honeycomb segments further includes partition walls connecting the opposing corners of the respective cells each having a rectangular sectional shape, and cells each having a triangular sectional shape in a radial direction, which are formed between the respective partition walls.

6. A honeycomb structure made by joining a plurality of honeycomb segments in each of which a plurality of cells each having a rectangular sectional shape in a radial direction are formed between partition walls which are at right angles to each other, characterized in that the outer periphery of the honeycomb structure is composed of honeycomb segments in which all the partition walls in the partition wall length direction on a cross section perpendicular to the fluid passage direction of a cell form an angle of 0° or more to less than 20°, or more than 70° to 90° or less with respect to a tangent to the outer periphery of the honeycomb structure at the positions where the respective partition walls contact with an outer peripheral wall.

7. The honeycomb structure according to claim 1, wherein all of the partition walls of the honeycomb segments with the larger compression strength have a compression strength larger than that of the honeycomb segments constituting the other portions of the honey structure.

8. The honeycomb structure according to claim 1, wherein the partition walls of the honeycomb segments with the larger compression strength have a larger compression strength along the entire length of the partition walls.

9. The honeycomb structure according to claim 1, wherein the plurality of honeycomb segments are joined together with a joining agent.

* * * * *